United States Patent [19]

Parke

[11] Patent Number: 5,982,439
[45] Date of Patent: Nov. 9, 1999

[54] CODING IMAGE DATA

[75] Inventor: Ian Parke, Suffolk, United Kingdom

[73] Assignee: British Telecommunications public limited company, London, United Kingdom

[21] Appl. No.: 08/586,724

[22] PCT Filed: Jul. 29, 1994

[86] PCT No.: PCT/GB94/01651

§ 371 Date: Feb. 1, 1996

§ 102(e) Date: Feb. 1, 1996

[87] PCT Pub. No.: WO95/04432

PCT Pub. Date: Feb. 9, 1995

Related U.S. Application Data

[63] Continuation-in-part of application No. 08/165,693, Dec. 13, 1993, abandoned.

[30] Foreign Application Priority Data

| Jul. 30, 1993 | [GB] | United Kingdom | 9315859 |
| Dec. 10, 1993 | [EP] | European Pat. Off. | 93310008 |

[51] Int. Cl.$^6$ ................................................ H04N 7/32
[52] U.S. Cl. ............................................ 348/416; 348/699
[58] Field of Search ........................... 348/409, 412, 348/413, 415, 416, 699, 402, 407, 420; 382/232, 236, 238; H04N 7/32

[56] References Cited

U.S. PATENT DOCUMENTS

| 5,293,229 | 3/1994 | Iu ................................................ 348/415 |
| 5,317,397 | 5/1994 | Odaka et al. ............................... 348/699 |
| 5,321,508 | 6/1994 | Veltman et al. |

FOREIGN PATENT DOCUMENTS

| 0395440 | of 1990 | European Pat. Off. |
| 0424026 | of 1990 | European Pat. Off. |
| 0479511 | of 1991 | European Pat. Off. |
| 0510640 | of 1992 | European Pat. Off. |
| 0518314 | of 1992 | European Pat. Off. |
| 0557948 | of 1993 | European Pat. Off. |
| 2153625 | of 1985 | United Kingdom. |

OTHER PUBLICATIONS

"Patnt Abstacts of Japan, vol. 14, No. 529(P–1133, Nov. 20, 1990 & JP–A–02 222 022 (Victor Company of Japan, Ltd.)"Sept. 4, 1990.

Patent Abstract of Japan, vol. 17, No. 39 (E–1311), Jan. 25, 1993, & JP–A–04 257 184 (NEC Corp.), Sept. 11, 1992.

*Primary Examiner*—Richard Lee
*Attorney, Agent, or Firm*—Nixon & Vanderhye P.C.

[57] ABSTRACT

A system encodes video frames in accordance with the MPEG standard, in real-time. Motion vectors are calculated during the forward prediction of B frames and P frames using a telescoping procedure. Similarly, a telescoping procedure is used for calculating motion vectors for B frames during backwards predictive coding. The use of telescoping for the backward predictive coding results in B frames being coded in the wrong order. The correct order for B frames is re-established by writing the frames to a buffer in the order in which they are generated and then reading the frame data from the buffer in the order in which they are required for transmission or recording purposes. The use of the telescoping procedure reduces significantly the amounts of computation required for calculating motion vectors during predictive coding for frames which are displaced by more than one frame period. The use of a buffer to reorganize the frames does not add significantly to the overall hardware requirement because such a buffer would often be used for smoothing out irregular data rates.

17 Claims, 10 Drawing Sheets

BLOCK 26 HAS 961 POSSIBLE POSITIONS WITHIN BLOCK 27

CODING IMAGE DATA

CROSS-REFERENCE TO RELATED APPLICATION

This application is a continuation-in-part of our commonly assigned application Ser. No. 08/165,693 filed Dec. 13, 1993 now abandoned.

BACKGROUND OF THE INVENTION

1. Field of the Invention

The present invention relates to a method of and apparatus for predictive coding for video frames.

2. Related Art

Predictive coding is a known technique for compressing video data. A video frame to be coded is compared with a reference frame and, rather than generating data indicative of the frame in isolation, data indicative of the differences between the reference frame and the frame to be coded are generated.

Comparing individual pixels between a reference frame and a frame to be coded becomes significantly less efficient if movement occurs within the image. However, given that movement often results in a re-arrangement of elements within an image, rather than a complete re-generation of an image, there is still a degree of inherent redundancy and advantage may be taken of this in order to facilitate further compression.

Movement within a video sequence often consists of an element being moved between different portions of an image. Given that video frames are presented at 25 or 30 per second, the degree of movement, for most observable objects, is relatively modest from one frame to another. Thus, as previously stated, movement often consists of the re-arrangement of pixel values and advantage may be taken of this inherent redundancy in order to facilitate further compression.

In theory, it would be possible to consider each individual pixel and, for each individual pixel, calculate a motion vector which, for a present frame under consideration, identifies the position of a pixel in a reference frame having a similar value. However, it will be appreciated that the generation of motion vectors for each individual pixel would provide little compression compared to transmitting the individual pixel values themselves, therefore, in order to achieve a degree of compression, it is necessary to calculate motion vectors for pixel regions and to assume that the whole region moves in a similar way. It is therefore known to divide video images into blocks of pixels consisting of, for example, squares made up of 16×16 pixels. Thus, before difference data is transmitted for each pixel within a block under consideration, a search is performed around a similar region in a reference frame to identify a block of pixels in the reference frame which, when compared with the block to be transmitted, results in, on average, the lowest absolute difference terms. Thus, once determined, these difference terms are transmitted, along with a motion vector identify the position of the identified block within the reference frame, relative to the position of the block under consideration.

Predictive coding can be used to generate difference values for the frame (n+1) which immediately follows the reference frame (n). In addition, the method may also be used to predict subsequent frames, such as frame n+2, n+3 etc. Under these circumstances the reference frame search area, for which movement has to be considered, increases for each incremental frame displacement. Furthermore, it should be appreciated that such an increase occurs in two dimensions.

In order to facilitate the calculation of motion vectors, it is possible to perform a telescoping technique, in which a motion vector is identified for the first frame displacement, between frame n and frame n+1 whereafter a motion vector is calculated for frame n+2 with reference to frame n using the motion vector calculated for frame n+1 to define a shifted detection range.

When coded frames are being transmitted in real time, it is desirable to transmit coded data as soon as possible. Thus, in the example given above, it is necessary to code frame n+1 in order that motion vectors may be calculated for frame n+2. Consequently, it is desirable, as soon as frame n+1 has been coded, to transmit this frame and thereafter to effect processing for the coding of frame n+2 so that this frame may be transmitted.

In some situations, particularly when transmitting data in accordance with an accepted standard, the desired order of transmission may differ from that which naturally results from the telescoping process. A problem therefore results in that it is difficult to implement a telescoping process if the resulting coded frames are generated in the wrong order.

SUMMARY OF THE INVENTION

It is an object of the present invention to provide an improved method and apparatus for predictive coding for video frames.

It is a further object of the present invention to provide an improved method and apparatus for predictive coding by telescoping, wherein the resulting coded frames are generated in an order which differs from that required by a particular transmission standard.

According to a first aspect of the present invention, there is provided a method of the aforesaid type, characterised by writing frame n–1 to a buffer before writing frame n–2 to said buffer; and reading frame n–2 from said buffer prior to reading frame n–1 from said buffer.

In a preferred embodiment, a frame n is predicted from an earlier frame n–m by forward predictive coding.

According to a second aspect of the present invention, there is provided apparatus of the aforesaid type, characterised by buffering means; means for writing coded frame n–1 to said buffering means prior to writing coded frame n–2 to said buffering means; and means for reading coded frame n–2 from said buffering means prior to reading coded frame n–1 from said buffering means.

In a preferred embodiment, the apparatus codes frames in accordance with the MPEG recommendation.

In a further preferred embodiment, the apparatus is used in video conferencing facilities of video telephones.

BRIEF DESCRIPTION OF EXEMPLARY EMBODIMENTS

The invention will now be described by way of example only, with reference to the accompanying figures, in which.

Figure 1:
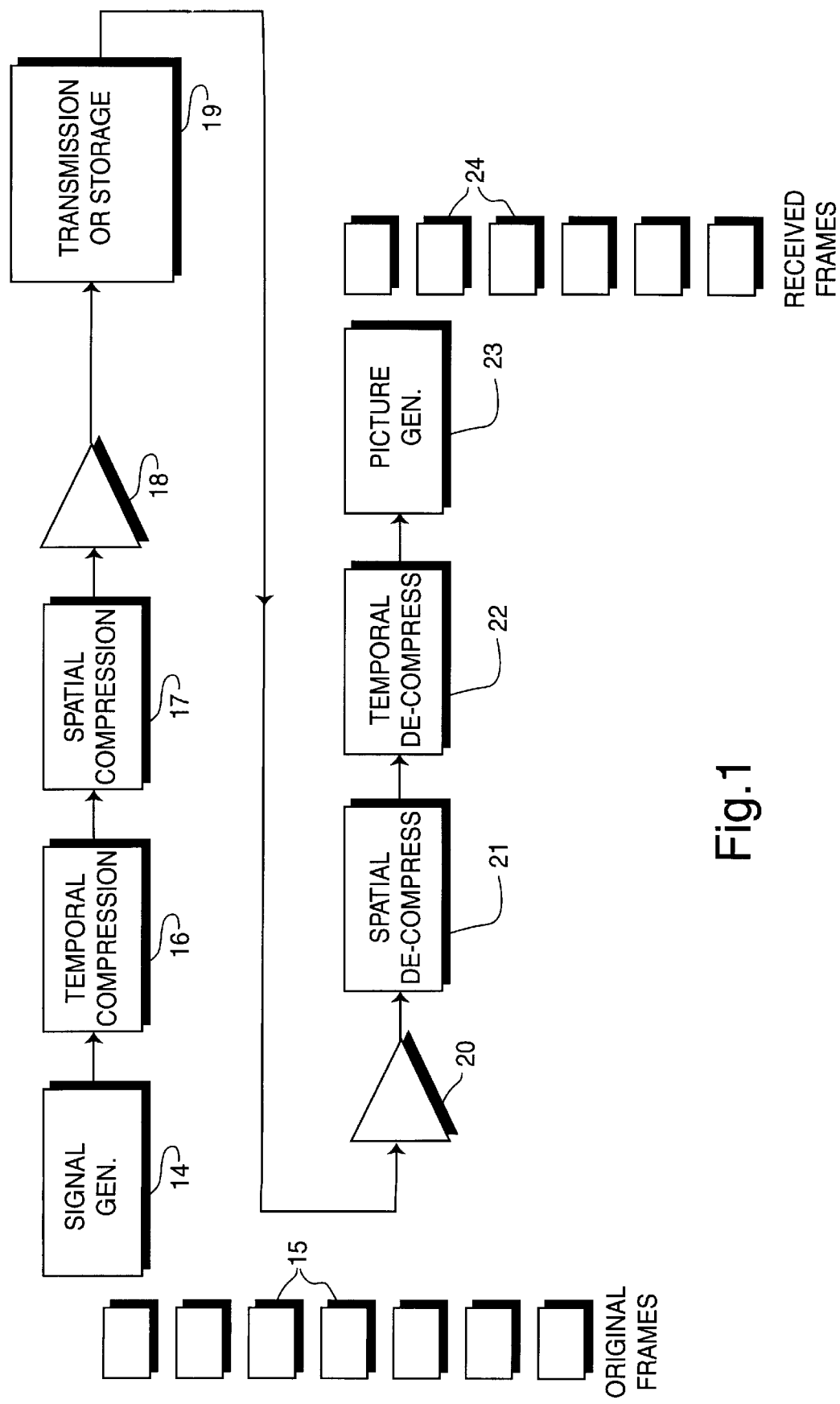
FIG. 1 shows a system for compressing and decompressing video signals, for transmission or storage, including a circuit for effecting temporal compression.
Figure 3:
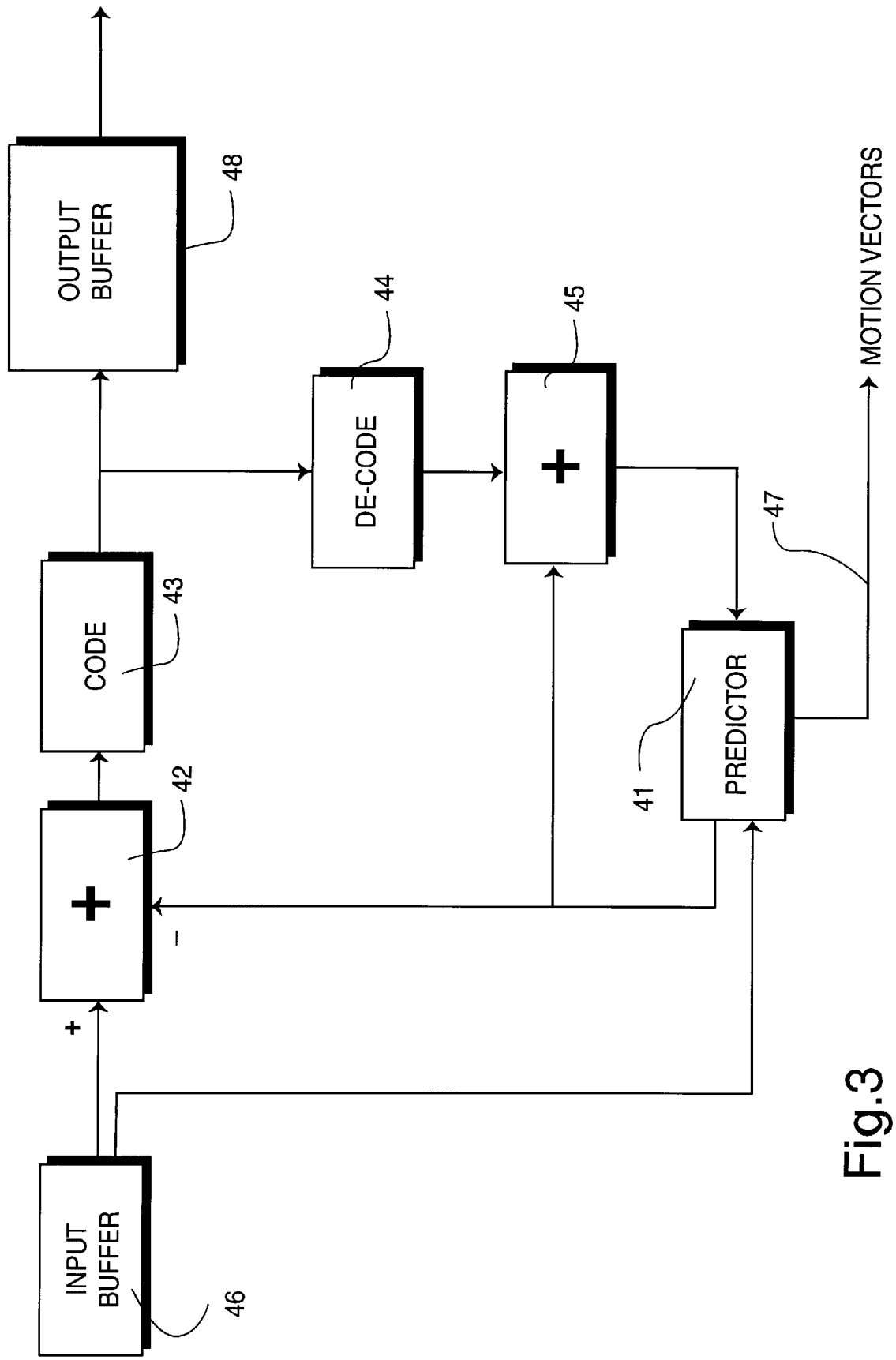
Figure 4A:
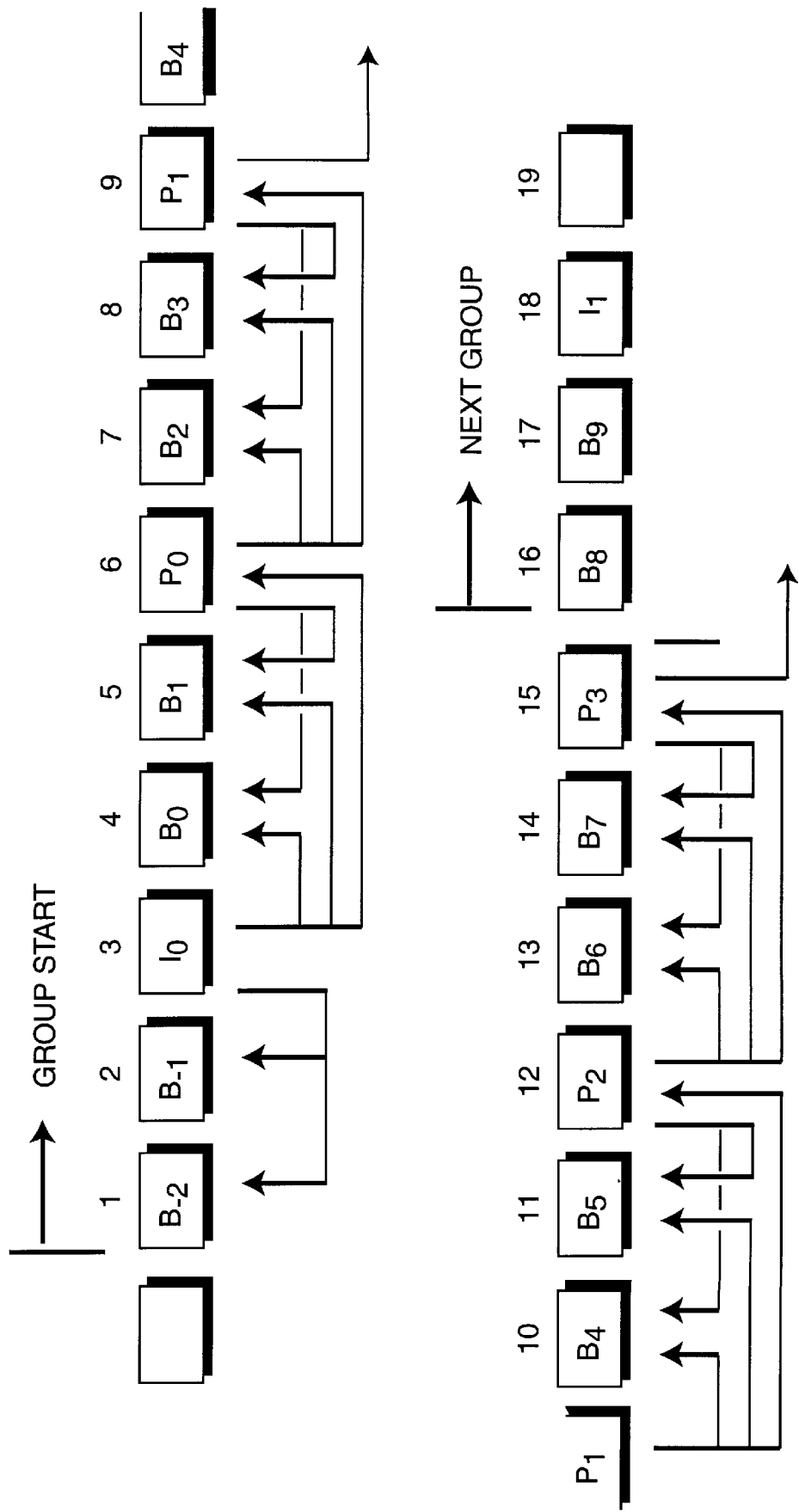
Figure 4B:
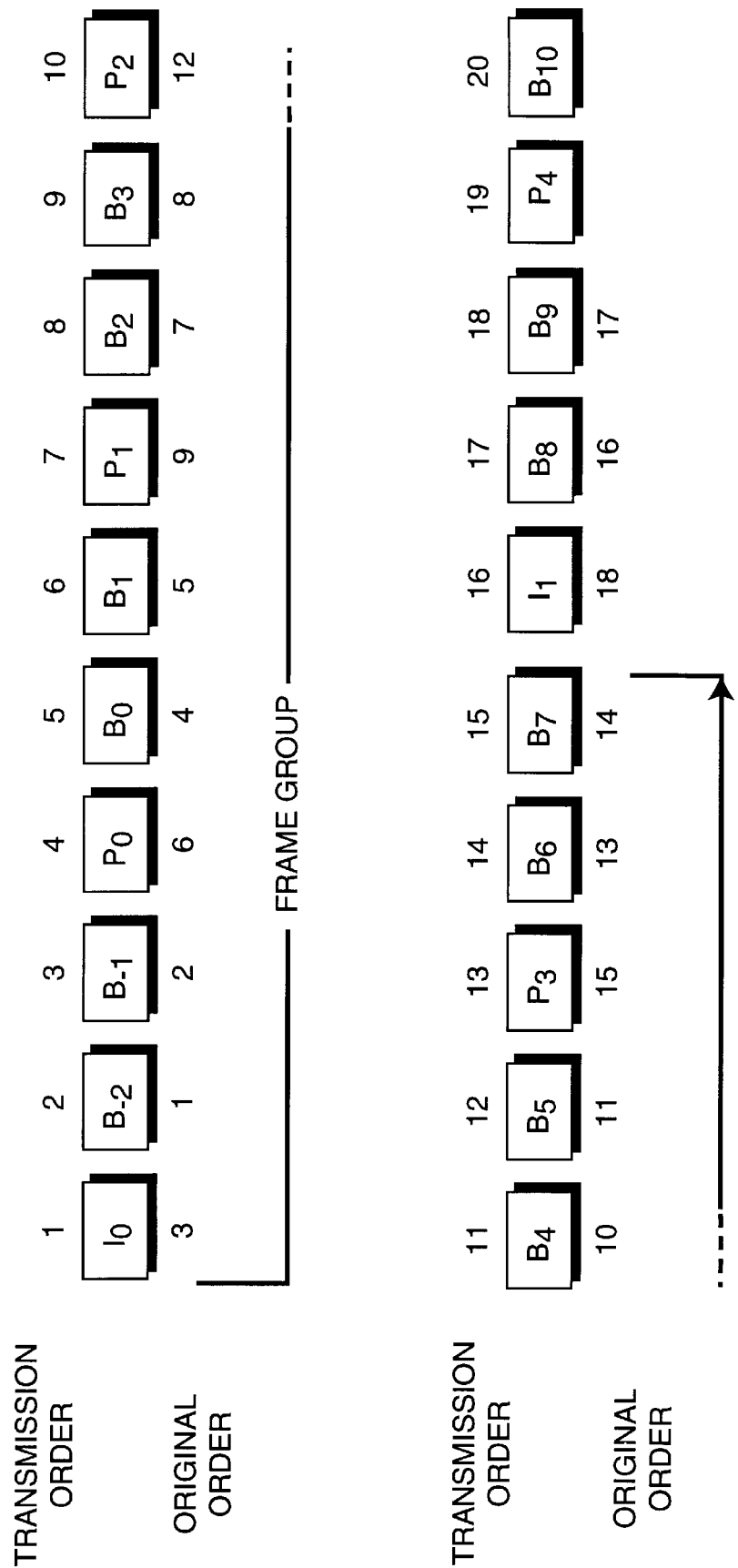
Figure 5:
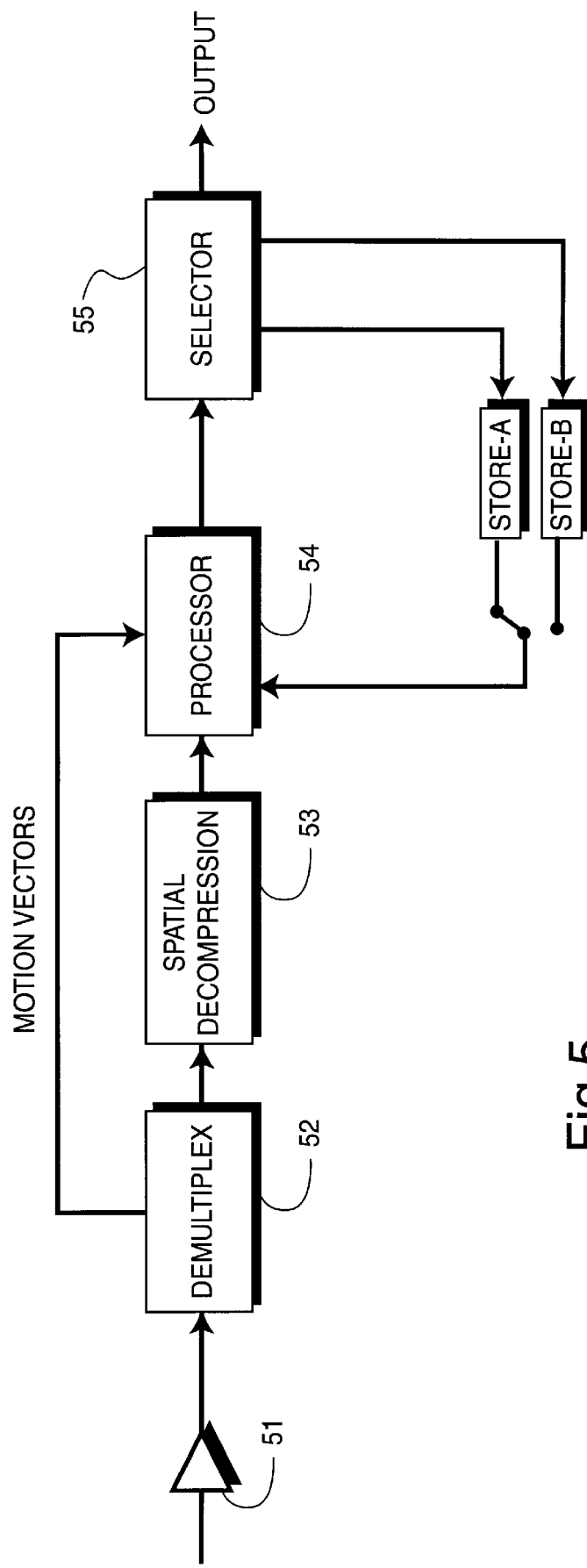
Figure 7:
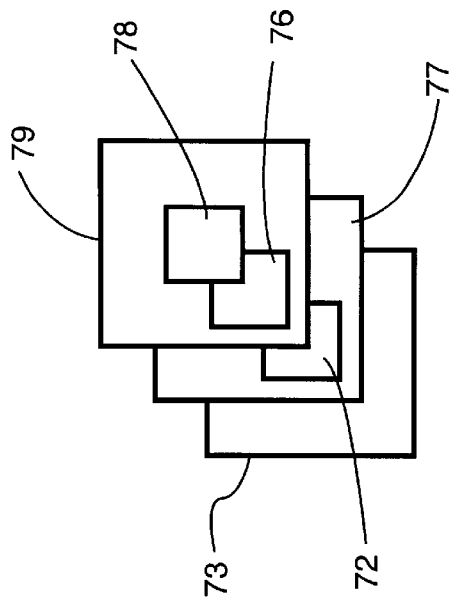
Figure 6:
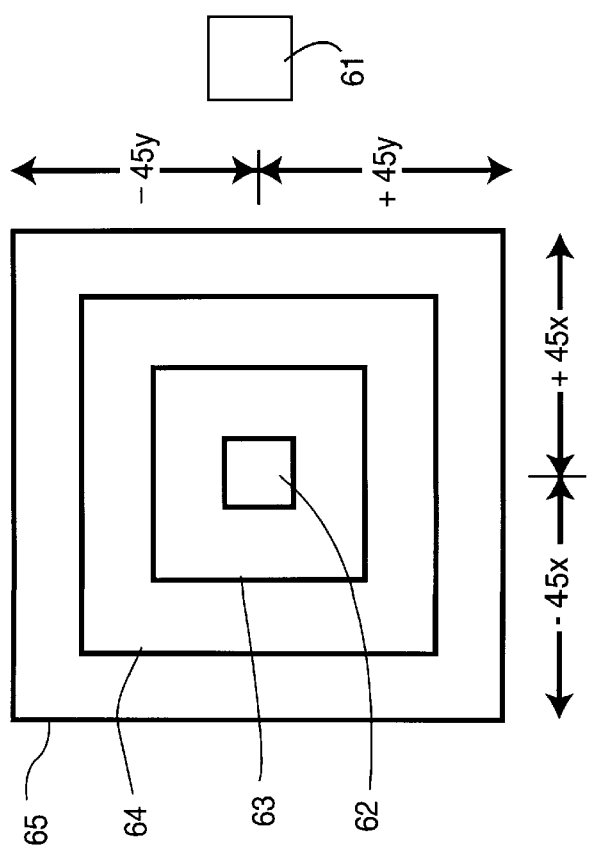
Figure 8:
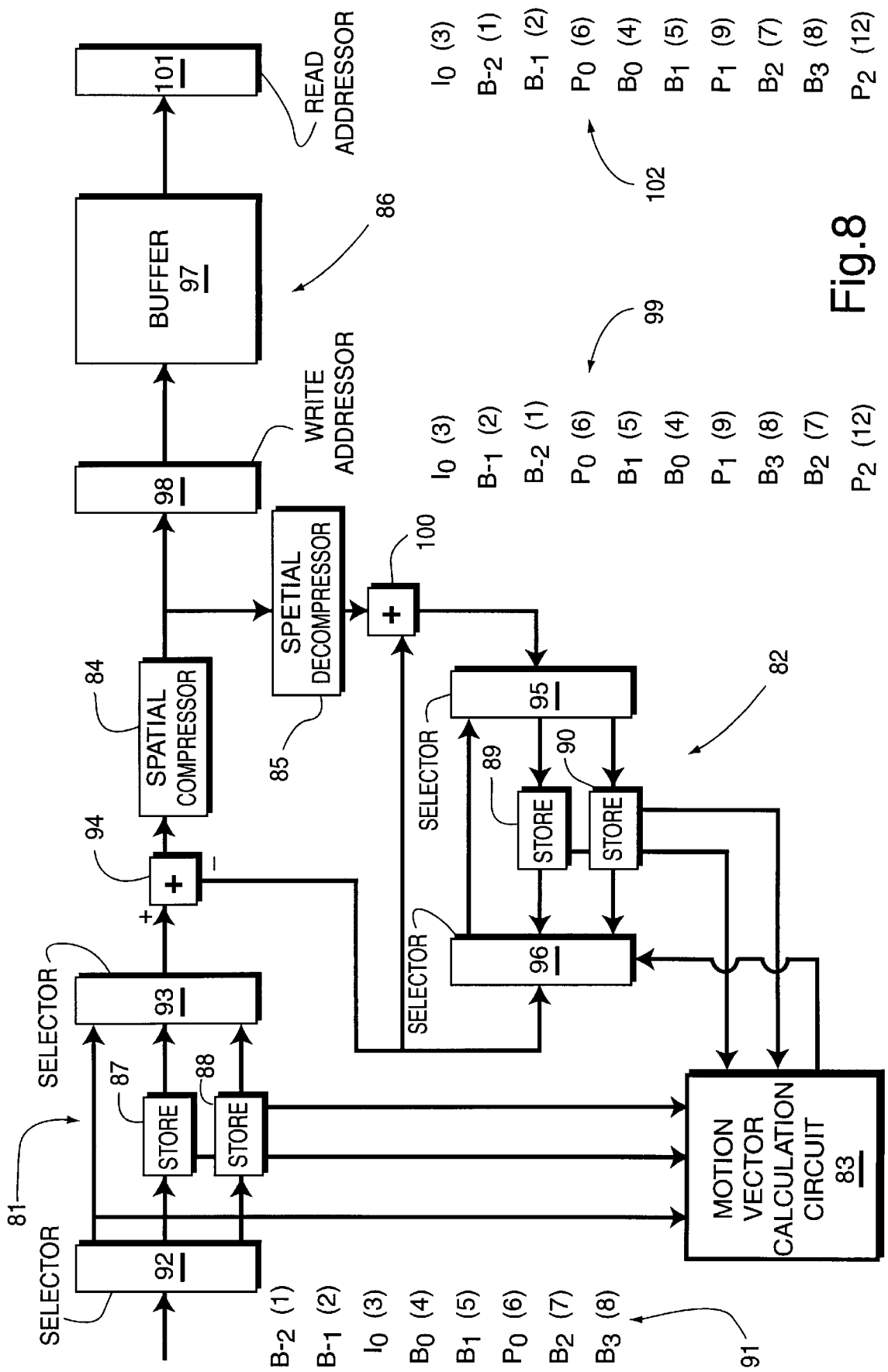
Figure 9:
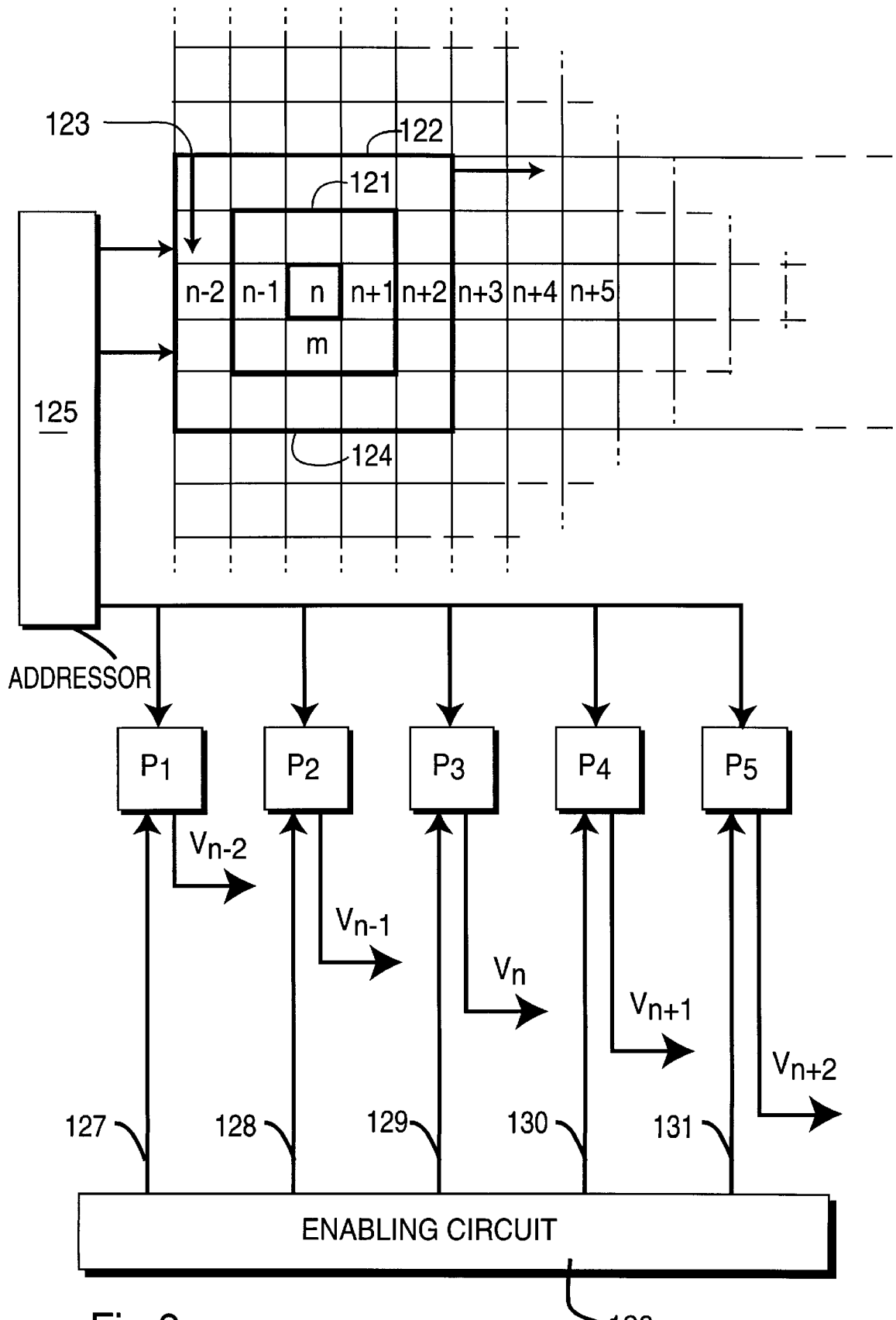

FIG. 3 details a known circuit for effecting temporal compression, of the type shown in FIG. 1;

FIG. 4A illustrates types of frames considered in accordance with the MPEG recommendation, prior to coding;

FIG. 4B illustrates a coded stream of MPEG frames;

FIG. 5 details a circuit for decoding video frames compressed in accordance with the MPEG recommendation;

FIG. 6 illustrates areas or a reference frame compared with a frame to be coded, for calculating motion vectors, when frames are separated by more than one frame spacing;

FIG. 7 illustrates a telescopic search for calculating motion vectors;

FIG. 8 shows a circuit for motion vector calculation with telescoping, including a circuit for calculating motion vectors; and FIG. 9 details the motion vector calculation circuit, identified in FIG. 8.

A system for compressing video signals, transmitting of storing said signals and decompressing said transmitted or stored video signals, is shown in FIG. 1. Full bandwidth video signals are generated by a video signal generator 14, which may take the form of a video camera or video reproducing means, such as a magnetic tape or an optical disc player etc. The signal generator 14 generates a sequence of original frames 15 which are supplied to a temporal compression circuit 16. The temporal compression circuit takes advantage of similarities between temporally spaced frames and generates coded signals representing the differences between said frames. The output from said temporal compression circuit 16 is supplied to a spatial compression circuit 17, arranged to take advantage of further redundancies within specific image frames. Thus, the spatial compression circuit 17 may make use of discrete cosine transform coding, such that the amount of data generated for each frame is dependent upon the actual amount of information contained within the frame.

Thus, the combination of temporal compression and spatial compression is known to achieve a significant degree of video data compression, allowing a compressed video signal of this type to be transmitted over limited bandwidth channels, such as those used in video telephony or, alternatively, stored on standard computer-based storage media, such as single-platen magnetic discs or audio-based compact optical discs (CD-ROMS).

The output signal derived from the spatial compression circuit 17 is amplified by amplifier 18 for transmission or storage, as identified by reference 19.

At a receiver, or within replaying apparatus, a coded signal received from a transmission medium or read from a storage device, is supplied to an amplifier 20, whereafter the procedures performed to achieve compression are effectively reversed, so as to decompress the picture. Thus, circuit 21 performs spatial decompression, whereafter a circuit 22 performs temporal decompression, thereby supplying a full bandwidth video picture to a picture generating device 23, such as a video monitor, which in turn displays a sequence of decompressed video frames 24.

the present invention is particularly concerned with aspects of temporal coding and decoding, although it should be appreciated that, in many environments, spatial compression techniques will be included in addition to temporal compression techniques. A compression technique which does take advantage of both of these types of compression is that proposed by the Moving Picture Experts Group of the International Standards Organisation (ISO), commonly referred to as MPEG.

Temporal compression is effected by taking a first frame as a reference frame and comparing this reference frame with a frame which is to be coded. Coding is achieved by identifying differences between the frame to be coded and the reference frame and coding a representation of these differences, so that the original frame may be reconstructed at the receiver or upon playback.

A first step would consist of comparing each pixel of the frame to be transmitted with the corresponding pixel of the reference frame. Generally, pixels are made up of several colour components, such as RGB or, more commonly in transmission systems, luminance plus two colour difference signals. Thus, for each of these components, the value of the frame to be transmitted may be compared with the reference frame and, rather than transmitting the full value for the pixel to be transmitted, the difference between the two pixel values may be transmitted. Thus, in some situations, the difference between the two values on a frame-by-frame basis may be very small, particularly if the originating image is stationary. However, as movement occurs, the differences will start to get larger and with substantial amounts of movement, the savings may become minimal. Furthermore, given an environment having limited bandwidth for transmission or storage, movement may result in picture break-up.

Although differential coding techniques will eventually break down if significant movement occurs, it is apparent that, in the majority of video sequences, movement consists of actual objects within an image frame moving over a predetermined period of time. Thus, given that a significant number of frames will elapse in just one second of the video sequence, it is likely that a moving object will not result in significant changes to the overall frame information content, although significant changes will be occurring to individual pixels. Thus, it would be possible to reduce the amount of information transmitted if information identifying a motion vector could be transmitted, along with difference signals taken, not from the original positions of the reference frame, but from positions shifted from the original in accordance with the motion vector.

A system for compressing video data in this way, that is to say, by the calculation of motion vectors in addition to differential coding, is disclosed in U.S. Pat. No. 5,083,202, assigned to the present Assignee. In accordance with this disclosure, a video frame is divided into a plurality of blocks, each consisting of 16 lines with 16 pixels on each line, that is, a 16×16 block. The division of frames into blocks is also required for spatial compression, using the discrete transform method but, usually, this involves a division into blocks of 8×8 pixels. When using both techniques, each 16×16 pixel region is assembled from four 8×8 blocks and, to distinguish between the two, the larger block is referred to as a macro-block.

Figure 2A:
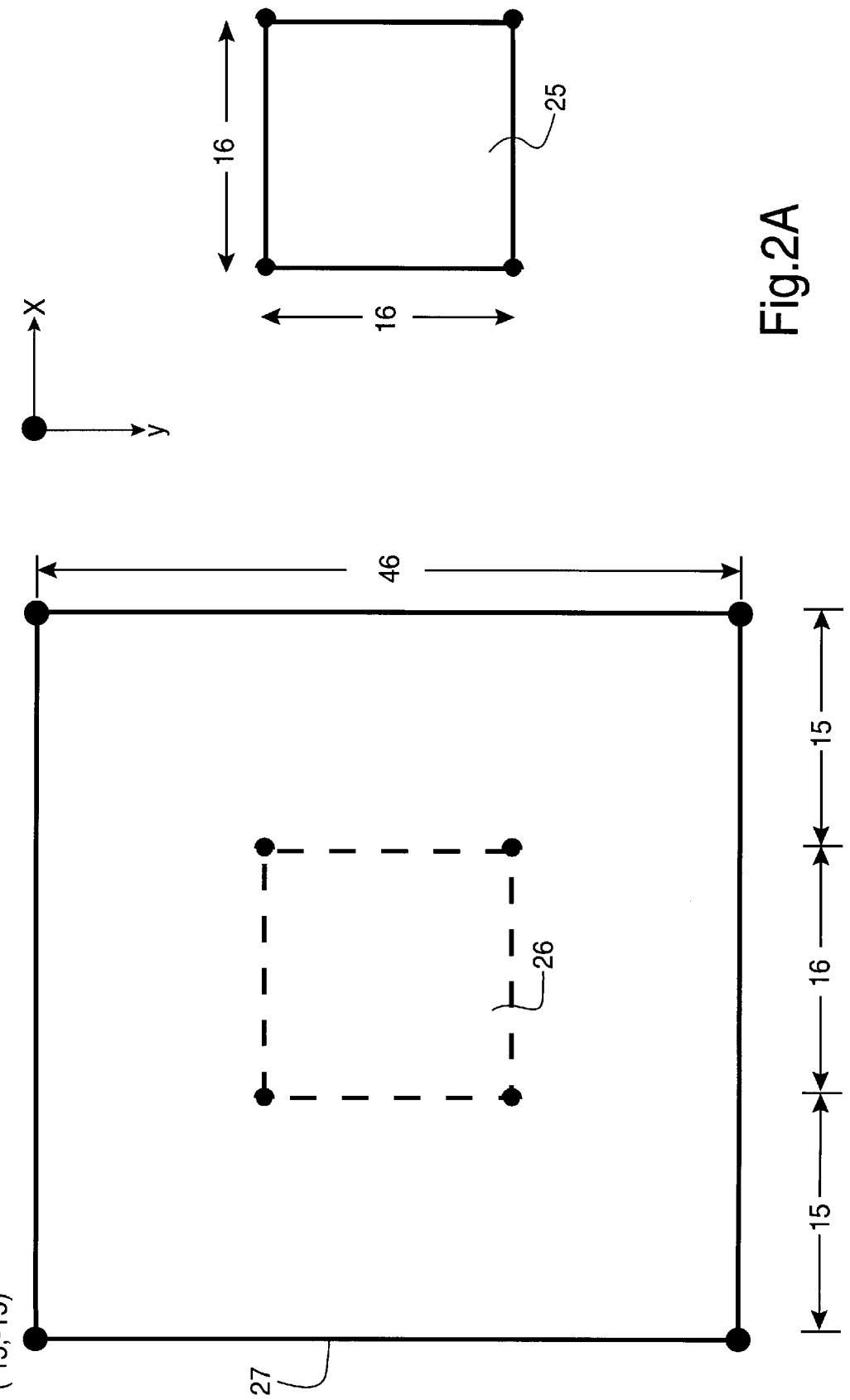
FIG. 2A illustrates a block of pixels of a frame to be coded and a block of pixels in a reference frame, for the purpose of calculating a motion vector.

A macro-block of pixels of this type is shown in FIG. 2A. Motion vectors are not derived from, and are not necessarily related to, actual movements of objects shown in the image frame. As used herein, a motion vector refers to a particular 16×16 macro-block and it represents a movement, in the positive or negative X and Y directions, by an integer number of pixel spacings, of a block in the reference image which, when compared with the block to be transmitted, produces the lowest difference values. Thus, it is possible that a vector can be identified which satisfies this criterion without actually being related to an actual motion of an object in the image frame. However, in practice, it is likely that a vector will be identified which satisfies this criterion due to actual motions which have occurred substantially in the direction of the motion vector.

The resolution of a motion vector is substantially an arbitrary choice, based upon the degree of compression required and the processing facility available. In this example, the motion vectors are measured in terms of whole pixel spacings, however, fractional pixel spacings could be used and new pixel values, at sub-pixel positions, could be calculated by interpolation. Similarly, the size of the search area has been chosen so as to accommodate most speeds of movement, while at the same time placing realistic constraints on the processing facility required in order to calculate the motion vectors. This is particularly important when the motion vectors, on the transmission side, are being calculated in real time.

The identification of the preferred motion vector for a particular block is a highly computationally demanding procedure. However, it should be appreciated that, once the vector has actually been established, used to effect the coding and then transmitted or recorded for the purposes of effecting decoding, the decoding procedure is significantly less computationally demanding. Thus, given a motion vector, it is a very straightforward exercise to use this vector in order to identify the preferred block within the transmitted reference frame. However, on the transmission side, it is necessary to actually calculate the vector before it may be used to effect the coding.

The way in which a motion vector is calculated for a particular block will be described with reference to FIG. 2A and FIG. 2B. In FIG. 2A, a 16×16 block of pixels to be coded is identified as 25. This block of pixels is coded by identifying a similar block in a reference frame and, rather then transmitting actual pixel values for the present block, difference values are transmitted which represent the arithmetic difference between the pixel values in the block of the frame to be transmitted and the pixel values in the identified block of the reference frame.

Block 26 is a 16×16 block of pixels in the reference frame which is present at the equivalent position to block 25 in the present frame. Thus, if predictive coding without motion vectors were being employed, pixel values within block 25 would be compared directly with pixel values within block 26.

However, when taking account of movement and employing motion vectors, a search is performed to identify, within the reference frame, a 16×16 pixel block which produces smaller difference terms than would be produced if difference values were calculated from block 26.

In theory, it would be possible to examine all possible blocks within the reference frame, however, this would require a massive computational requirement and would be virtually impossible to implement in real time. Thus, a compromise is made and, in this particular embodiment, a search is made by shifting from the base position of the 16×16 pixel block (from the position identified by reference 26) to positions of plus and minus 15 pixel spacings in both the X and Y directions.

Thus, given a plus or minus 15 pixel displacement, a reference block of pixels for coding block 25 may be obtained from anywhere within block 27 of the reference frame. Thus, block 27 is a block made up of 46×46 pixel positions and a 16×16 pixel block may occupy any of the 961 (31×31) positions within block 27.

In order to determine which of these possible positions provides the best motion vector, all possible positions are considered and a selection is made, based upon the position which results in the smallest difference values between block 25 to be transmitted and a reference block within block 27. The algorithm executed in order to determine the best possible motion vector is illustrated in FIG. 2B.

For the purposes of this disclosure, the position of a 16×16 macro block, such as block 26, within the larger search area, such as block 27, will be referred to as the "block positon". Furthermore, the actual pixel positions within a 16×16 pixel macro block will be referred to as pixel position. Block position is described with reference to the position the block would occupy without being shifted under the influence of a motion vector. Thus, the position of a block within area 27 is described with reference to the position of block 26. Furthermore, the X, Y co-ordinates of the block position within area 27 are also equivalent to the motion vector required to transform block 26 to a block position at which actual difference values are calculated.

As previously stated, a motion vector is determined for each block by considering each possible block position within region 27. This is initiated by considering the block at the top left corner, positioned by a motion vector (minus 15, minus 15).

At step 30 the next block position is determined, defined by a motion vector (X, Y) which, as previously stated, will be the top left block on the first iteration.

At step 31 a variable identified as the sum of the differences, sigma D, is set to zero. Thus, step 32 initiates a loop which considers all of the pixel positions within the particular block position, thus, at step 32 the next pixel position is considered within the block and at step 33 an absolute difference value D is calculated by subtracting the reference pixel value from the pixel value to be transmitted, derived from block 25, while ignoring the sign of the difference.

At step 34 the difference value calculated at step 33 is added to the variable representing the sum of the differences, sigma D, which, on the first iteration, will consist of adding the value D calculated at step 33 to zero.

At step 35 a question is asked as to whether another pixel position is to be considered which, on the first iteration, will be answered in the affirmative, resulting in control being returned to step 32.

Thus, at step 32 the next pixel position is identified, the difference value for this pixel position is calculated at step 33 and again the difference value is added to the sum of the differences at step 34.

Thus, all of the difference values for the 16x≠pixel macro block are added together until all of the pixel positions within the macroblock have been considered and the question asked at step 35 is answered in the negative.

In addition to the value sigma D being determined, representing the sum of the differences for a particular block, another variable is stored, identified as sigma D (minimum), representing the lowest modular sum of difference values.

On initiating the algorithm, sigma D will have been set to a value large enough such that any typical value for sigma D will have a smaller modulus, resulting in the question asked at step 36 being answered in the affirmative.

When the question asked at step 36 is answered in the affirmative, sigma D (minimum) is set equal to the calculated value for sigma D at step 37. Similarly, at step 38, an X component for the motion vector V (X) is set equal to X, as determined at step 30 and, similarly, the Y component for the motion vector V (Y) is set equal to Y.

At step 39, a question is asked as to whether another block position is to be considered and when answered in the affirmative, control is returned to step 30, whereupon the next X, Y block position is selected.

Thus, for each block position, all of the pixel values within that block are compared against block 25, that is, the block to be coded. All of the absolute pixel difference values (that is modulus difference values) are added together and the modulus of this sum is compared to check whether it is the smallest found so far. If it is the smallest found so far, it replaces the previous smallest so far and establishes a new best motion vector so far, at step 38.

After all of the block positions have been considered, resulting in the question asked at step 39 being answered in the negative, the variable sigma D (minimum) will represents the smallest sum of differences and the value stored for V (X) and V (Y) will represent the X and Y co-ordinates of the best motion vector. This is the motion vector which results in the smallest difference values when the block 25 to be transmitted is compared with a reference block within region 27.

A circuit for performing differential coding is shown in FIG. 3. A prediction circuit 41 includes a frame buffer for storing pixel values of the previous frame. Thus, the previous frame becomes the reference frame and signals representing differences between the new frame and this reference frame are transmitted or relayed to the next stage of compression, as shown in FIG. 1. Differences are calculated by a subtracting circuit 42, which subtracts outputs produced by the prediction circuit 41 from the incoming pixel values. These pixel values are then coded by a coding circuit 43, possibly performing quantisation or Huffman coding, for subsequent transmission or processing.

The output from the coding circuit 43 is also supplied to a decoding circuit 44, arranged to perform the reverse process to the coding circuit 43. A decoding process is performed so as to ensure that a similar reference frame is generated at the originating side as will be reconstructed at the receiving side. It is possible that the coding performed by circuit 43 will introduce losses, therefore these losses must be taken into account at the originating side, to ensure that a similar picture is re-constructed.

Thus, the output from the decoding circuit 44 is supplied to a summation circuit 45, the output from which is supplied to the prediction circuit 41. In operation, blocks of image data from a frame to be coded are assembled in an input buffer 46. The next block of data to be transmitted is supplied to the prediction circuit 41, which is arranged to perform the motion vector calculation procedure, detailed previously. As a result of this procedure, the prediction circuit 41 determines a motion vector for the block, which is transmitted or recorded as such.

The prediction circuit 41 stores a complete copy of the reference frame. Initially, it identifies the equivalently positioned block in the reference frame as that for the block presently being coded. From this equivalently positioned block, the prediction circuit identifies a motion corrected equivalent block, by moving a number of pixel spacings, as defined by the motion vector.

Once a predicted block has been identified by the prediction circuit 41, pixel values for the block being coded are supplied to summation circuit 42, which also receives equivalent prediction values from the prediction circuit 41. Thus, for each pixel in the block being coded, its equivalent motion corrected pixel is subtracted therefrom and the difference, produced as an output from circuit 42, is supplied to the coding circuit 43.

Output pixels from the coding circuit 43 are assembled in an output buffer 48, which may be capable of storing several full frames of pixels, so as to facilitate transmission buffering. That is to say, it is desirable for pixels to be transmitted or recorded at a constant rate, so as to make optimum use of the available bandwidth. However, given the complex nature of the coding procedure, it is difficult to generate coded pixels at a constant rate, therefore buffer 48 is provided to smooth out variations in the rate at which coded data is produced.

As previously stated, the output from coding circuit 43 is supplied to an equivalent decoding circuit 44, whereupon pixel predictions produced by the prediction circuit 41 are added to the decoded values, by summation circuit 45 and fed back to the prediction circuit 41, to facilitate the building up of a subsequent reference frame, to allow coding of the next frame in the sequence.

Thus, it can be appreciated that, given a frame in a particular sequence of video frames, it is possible to calculate subsequent frames which occur in the sequence. This form of coding is referred to as forward predictive coding, in that a new frame is coded or decoded with reference to frames which occurred earlier in the sequence. In particular, each block of the new frame is decoded with reference to a block of a preceding frame. Firstly, the block may be in a different position from the corresponding position in this previous frame, the new position being identified by a motion vector. Secondly, transmitted values consist of pixel differences between the new block and the previously transmitted block.

As described in U.S. Pat. No. 5,083,202, it is possible to code forward predictive video signals in real-time, thereby allowing the technique to be used in transmission systems, in addition to systems where the encoding procedure can take significantly longer than the decoding procedure.

In accordance with the MPEG video compression recommendation, compressed video frames are generated in accordance with the forward predictive method described above. Frames of this type are called "P" frames and are one of three types of frame making up a compressed bit-stream.

A requirement of an MPEG system is that it should have entry points, that is to say, reference frames from which a play-back may be initiated, without making reference to previously transmitted frames. Thus, an MPEG stream may be considered as being made up of groups of frames, wherein each group is substantially self-contained, allowing edit points to be made at the boundaries of said groups. In order to allow image frames to be compressed into groups, it is necessary to transmit a frame which is compressed in such a way that it does not require information from any other frames in order for it to be regenerated. Such a frame is said to be intra coded; as distinct from inter coded in which information is required from other frames. Frames of this type are identified in the MPEG standard as "I" frames (intra coded) and P frames are frames that are forwardly predicted from I frames or other P frames.

A typical sequence of input frames for MPEG coding is shown in FIG. 4. A group is identified in this example as consisting of 15 frames although, in accordance with the recommendation, the group number is adjustable, effectively being a trade-off between compression ratio (that is to say, the ratio of compressed data to originating data) and image quality.

In the group of 15 frames shown in FIG. 4A, the intra coded frame I0 is identified as frame 3. Frame 6 of the input sequence is coded by forward predictive coding, as previously described, with reference to the I0 frame, frame 3. Similarly, forward predictive coding is also used to code frame 9, identified as P1, with reference to frame P0. The next predicted frame P2 is coded from frame P1 and final forward predicted coded frame P3 is coded from frame P2. Thus, in a group of fifteen frames there is one intra coded frame, which would be expected to require significantly more bandwidth than the subsequent frames and four forwardly predicted frames, derived substantially using the technique illustrated with reference to FIG. 3.

The remaining ten frames of the fifteen frame group may be considered as being derived with reference to frames which bound them on either side. As far as the actual coding is concerned, frames 4, 5, 7, 8, 10, 11, 13 and 14 may be forwardly predicted from an I frame or a P frame, in the same way in which the P frames are forwardly predicted. Thus, for each block, a motion vector is identified, followed by pixel difference values for each pixel within the block.

However, it will be appreciated that, on some occasions, a scene change may occur between a forwardly predicted frame and the reference frame from which its prediction values are being derived. When this occurs, there is very little correlation between the predicted frame and the reference frame, resulting in very large difference values, which could take on similar proportions to the level of information required to transmit the predicted frame as an intra-frame. Thus, under such conditions, the advantages of the predictive coding are lost, which would tend to result in picture degradation as the system attempts to transmit a scene change which requires bandwidth beyond that available. To some extent, such a situation may be tolerated by the output buffer 48, assuming other frames are being coded with enough efficiency to provide additional bandwidth capacity. However, on occasions, it is possible that changes of this type would result in noticeable picture degradation.

In an attempt to overcome situations of this type and to further reduce the bandwidth requirement, it is possible that frames 1, 3, 4, 5, 7, 8, 10, 11, 13 and 14 are coded with reference to a subsequent frame in the video sequence, rather than a previous frame. Thus, rather than the predictive coding occurring in a forward direction, the predictive coding is actually occurring in a backward direction. Thus, these frames are identified as B frames (bidirectional) although it should be appreciated that the choice of forward coding or backward coding will be made on a frame-by-frame basis, depending upon whichever method requires the least amount of information. Furthermore, a bidirectional coded frame may be coded with reference to both previous and subsequent frames.

Thus, it may be assumed that a scene change occurs between frame 4 and frame 5. If frame 5 were being generated using forward predictive coding, its reference frame would be frame 3. Frame 3 forms part of a previous scene and therefore has little correlation with frame 5, being taken from a subsequent scene. Thus, a significant amount of information is required, if frame 5 is to be faithfully reproduced.

A significant amount of information will have been transmitted, in this example, in order to generate frame 6, by the forward predictive coding method. It is apparent that a scene change has occurred between frame 3 and frame 6 as will be illustrated by the amount of information required to generate frame 6, therefore it is clear that the effect of the scene change has effectively been taken into account in the coding of frame 3 and frame 6.

The change occurs between frame 4 and frame 5 and frame 4 can be faithfully reproduced with reference to frame 3. However, when coding frame 5, far less information will be required if said frame is coded with reference to, say, frame 6, i.e. using the backward predictive method, rather than with reference to frame 3. However, the coding system does not know that frame 5 should be coded from frame 6, rather than frame 3, until attempts have been made to perform both types of coding. When both types of coding have been performed, it is then possible to compare the results of each and choose the type of coding which results in the least amount of data being transmitted.

Thus, in this example both frame 4 and frame 5 will initially be coded in the forward predictive manner and in the backward predictive manner. Then, frame 4 will be transmitted using to the forward predictive coding, while frame 5 will be transmitted using to the backward predictive coding.

Given that a B frame may be generated from an earlier frame, by forward predictive coding, or from a subsequent frame, by backward predictive coding, it is necessary to reorganise the order of frame data for transmission or recording purposes. This re-ordering is shown in FIG. 4B. If it is assumed that frame 1, shown in FIG. 4A, is the very first frame of a particular sequence, it is not possible to produce this frame by forward prediction, because there are no earlier frames. Thus, both frames 1 and 2 are produced by backward predictive coding and are therefore transmitted after frame 3. Thus, as shown in FIG. 5, the first frame to be transmitted is frame 3, followed by frames 1 and 2. After frame 3, it is not possible to transmit frames 4 and 5 because these frames may also be encoded with reference to frame 6, rather than frame 3, therefore the next frame to be transmitted is frame 6, followed by frames 4 and 5. Similarly, the next frame is frame 9, followed by frame 7 and 8, whereafter frame 12 is transmitted, the P2 frame, followed by frames 10 and 11, whereafter the P3 frame, frame 15, is transmitted followed by frames 13 and 14.

A decoding circuit for an MPEG coded stream is shown in FIG. 5. The received signal is amplified by an amplifier 51, similar to amplifier 20 shown in FIG. 1. A demultiplexer 52 separates the pixel information, conveyed in the frequency domain, from the motion vectors and supplies said pixel data to a spatial decompression circuit 53. The spatial decompression circuit 53, similar to circuit 21 shown in FIG. 1, converts the spatially compressed data into pixel values or pixel difference values, which are in turn supplied to a processor 54.

Processor 54 performs temporal decompression and, in addition to receiving compressed pixel data from the spatial decompression circuit 53, is arranged to receive motion vectors from the demultiplexer 52 and reference data from a video frame store A and a video frame store B. In response to this information, the processor 54 is arranged to generate output frames in conventional video format.

As shown in FIG. 4(b), a frame group is transmitted in a re-arranged order, such that the decompression circuit 53 receives coded frame 3, followed by coded frame 1, coded frame 2 and coded frame 6 etc. Spatial decompression is performed and the decompressed frame data is supplied to the processor 54.

Frame 3 is an intra (1) frame and, as such, will have been transmitted with only spatial compression. Thus, after spatial decompression has been performed by circuit 53, the pixel data from frame 3 is complete, therefore, no further additional processing is required by processor 54 in order to generate output data and the pixel values for frame 3 are supplied to a selector 55.

However, frame 3 cannot be supplied to the output until frames 1 and 2 have been decoded, therefore selector 55 writes the pixel data to frame store A.

As shown in FIG. 4B, the next frame to arrive is frame 1 which, after being spatially decompressed, is supplied to the processor 54. Frame 1 was predictively coded with reference to frame 3 (backward coding), therefore output data is generated for frame 1 by reading reference values from store A, in response to the motion vectors, and adding the reference pixels to the transmitted pixels. No other frames are coded with reference to frame 1, therefore selector 55 is arranged to supply decoded frame 1 to the output.

The next frame to arrive is frame 2. Again, this frame will have been coded only with reference to frame 3, therefore the processor 54 decodes frame 2 with reference to values read from store A, again in response to the motion vectors supplied by the demultiplexer 52. Likewise, the selector 55 supplies decoded values to the output.

The next frame to arrive is frame 6, which again has been coded by the forward predictive method, with reference to frame 3. Thus, after spatial decompression, the processor 54 decodes frame 6, with reference to the motion vectors and to the reference values stored in store A and supplies the decoded values for frame 6 to the selector 55. On this occasion, frame 6 cannot be supplied to the output prior to frames 4 and 5 being decoded, therefore the decoded values for frame 6 are supplied, by the selector 55, to store B. At the same time, frame 3 is read from store A and supplied to the output.

Now that decoded versions of both frames 3 and 6 have been stored, it is possible to decode frames 4 and 5 and to supply these to the output. Frames 4 and 5 may be decoded forwardly, backwardly or bidirectionally, given that all the necessary information is available. After frames 4 and 5 have been supplied to the output, frame 6 is read from store B and also supplied to the output.

After frame 5 has been supplied to the output, it is no longer necessary to retain frame 3, therefore store A may be overwritten. The next frame to arrive is frame 9. This is decoded with reference to frame 6 and written to store A. Thus, the process previously described for frames 4 and 5 is repeated for frames 7 and 8. Frames 7 and 8 are decoded and supplied to the output, whereafter frame 9 can be read from store A and itself supplied to the output.

Thus, it will be appreciated that by following similar techniques, all of the frames can be decoded until another intra frame is received, and the whole process is repeated. It should also be appreciated that the hardware requirements, particularly in terms of the number of frame stores, is not affected by the number of bidirectional frames included in the frame group. Bidirectional frames are decoded as they are received, with reference to the two frames stored in stores A and B.

In applications where the encoding speed is not critical, no particular difficulties are encountered in encoding a video sequence in accordance with the MPEG requirements, as illustrated in FIG. 4. However, there are two significant problems which arise when attempting to encode in accordance with this standard, in real-time.

As shown in FIG. 2A, in order to determine a motion vector for just one 16×16 pixel macro block 25, it is necessary to consider pixel difference values for all block positions within a region 27 (a 46×46 pixel positions square). Such a region allows suitable motion vectors to be determined when predictive coding is being effected between adjacent frames. However, as illustrated in FIG. 4A, it is necessary to predictively code frame 6 with reference to frame 3. In this case, frame 6 is not directly adjacent to frame 3 but is separated from frame 3 by a total of 3 frame spacings.

If movement occurs over the duration defined by frames 3, 4, 5 and 6, it is possible that this movement will take place in a constant direction. Thus, the reference block of pixels from which minimal difference values may be determined, will move across the image frame such that the search area will effectively shift on a frame by frame basis. Thus, whereas a shift of plus or minus 15 pixel positions is required for adjacent frame positions, the size of the region must increase as the frame spacing increases, in order to achieve similar results.

Thus, in order to predictively code frame 4 from frame 3, say, it is necessary to consider block positions at plus or minus 15 pixel locations, as illustrated in FIG. 2A. However, when predictively coding frame 5 from frame 3, the frame spacing has increased by one frame position, therefore it would be necessary to consider block positions at plus or minus 30 pixel positions, in order to achieve comparable results. Similarly, the search region increases by a further plus or minus 15 pixel positions when coding frame 7 from frame 3. Thus, in order to effect 3 frame spacings, it is necessary to consider a region of pixels defined by a block displacement of plus or minus 45 pixel locations.

Figure 2B:
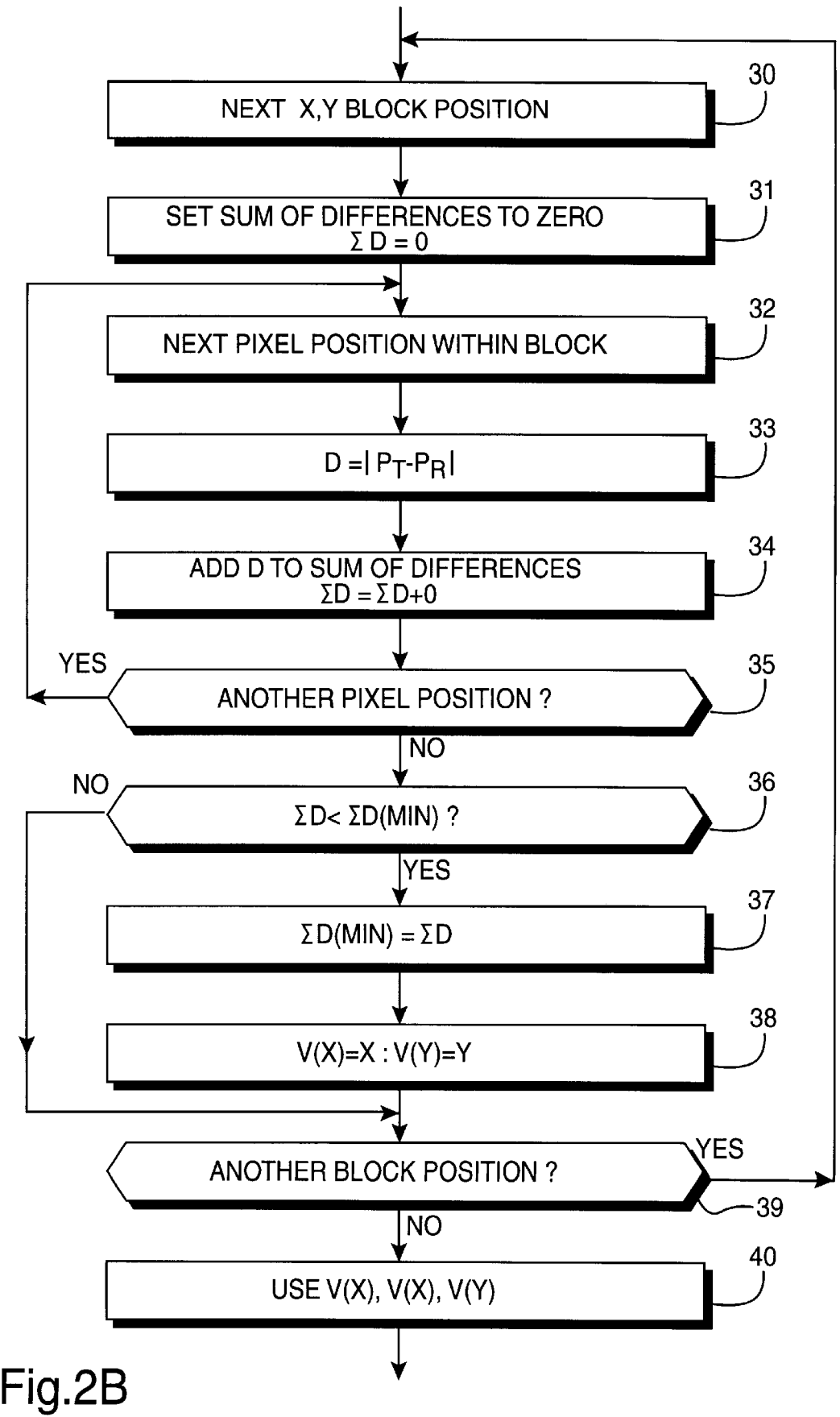
FIG. 2B illustrates an algorithm for calculating a motion vector.

Thus, it will readily be appreciated that the direct calculation of motion vectors for frame 6, with reference to frame 3, would result in a tremendous computational overhead, if a region defined by displacements of plus or minus 45 pixel locations were to be searched in accordance with the algorithm defined in FIG. 2B.

The problem can be appreciated by making reference to FIG. 6. In this example, a compression encoding device has received original image frames 3, 4, 5 and 6, which are to be coded as I0, B1, B2, and P0. Frame P0 is coded by the forward predictive method with reference to frame I0. Thus, all of the frames have been divided into macro blocks of 16×16 pixels and each macro block is then coded by defining a motion vector, along with pixel difference values. As previously stated, when considering blocks for coding frame P0, there are three frame spacings between blocks derived from frame I0 and the blocks to be coded with reference to frame P0. In frame 6, block 61 represents a 16×16 macro block of pixels which are to be coded for transmission as part of the P0 frame. Using the forward predictive coding method, the corresponding block in frame I0 is referenced 62. A motion vector is defined for one frame spacing, which will be frame 4, which specifies the position of block 62 anywhere within square 63. This represents a possible displacement of plus or minus 15 pixels in the X and Y directions.

On the next frame spacing, that is from frame 4 to frame 5, a plus or minus 15 pixel displacement must be considered, such that, after two frames, it is possible for block 62 to be anywhere within square 64. Thus, the area over which difference values are to be calculated has significantly increased. However, although a significant increase has occurred, it is still not possible to provide a motion vector for frame P0, because this requires yet a further frame spacing.

A further frame spacing results in another plus or minus 15 pixel displacements in both the X and Y directions, resulting in block 62 being anywhere within square 65. Thus, in order to provide a motion vector for block 61 from block 65, retaining the same level of quality as if the motion vector had been derived from block 63, it is necessary to consider pixel displacements up to plus and minus 45 positions in both the X and Y directions. Clearly, such a level of computation is virtually impossible to facilitate in real time, using a realistic hardware implementation.

As previously described, it is also necessary to bidirectionally encode frames 4 and 5. Thus, irrespective of whether the forward predictive values for frames 4 and 5 are actually transmitted, it is still necessary to calculate them, therefore, it will be necessary to calculate motion vectors for to blocks in frame 4, with reference to blocks in frame 3. This is equivalent to moving block 62 within the box 63, as also illustrated in FIG. 2. After all of the pixels in block 62 have been displaced by plus or minus 15 pixel positions in the X and Y directions, it is possible to average these values and calculate a preferred motion vector for the block 62.

An alternative approach known as "telescoping", is illustrated in FIG. 7. Block 62 is shown in FIG. 7 as block 72. A motion vector is determined by moving block 72 within area 73. As a result of these operations, a motion vector is calculated, which effectively re-positions block 72 to block 76. Thus, the pixels within block 76 may be used to forwardly predict a block of pixels in frame 4. Under normal predictive coding, frame 4 would now be used to predict values for frame 5, which in turn would be used to predict values for frame 6.

As previously stated, in accordance with the MPEG recommendation, values for frame 6 are not predicted from frame 5, via frame 4, but are predicted directly from frame 3. However, given that motion vectors need to be calculated for frame 4 and frame 5 anyway, these motion vectors may be used to calculate the final motion vector for frame 6. Thus, rather than trying to calculate a motion vector for frame 6 in one jump, requiring pixel displacements of plus or minus 45 pixel positions, the motion vector for frame 6 is calculated in stages, similar to the arrangement of small segments of a telescope being connected together so as to make quite a long device. Hence, the procedure of deriving a motion vector for frame 6 with reference to frame 3, by calculating a motion vector for frame 4 with reference to frame 3, calculating a motion vector for frame 5 with reference to frame 3, using the previously calculated motion vector as an offset and finally calculating a motion vector for frame 6 with reference to frame 3, again with an offset, is referred to as "telescoping".

FIG. 7 represents blocks of pixels within a reference frame. A block within a frame to be transmitted is, for the purposes of this example, separated from the reference frame by 3 frame spacings.

Thus, the frames under consideration consist of a reference frame, a frame to be transmitted and two intermediate frames which are positioned between the reference frame and the frame to be transmitted.

Each macro block of the frame to be transmitted is considered individually. Thus, for a particular macro block, an equivalent block position exists in the intermediate frames and in the reference frame. This equivalent block position is identified as block 72 in FIG. 7. This equivalently positioned block is compared with an equivalently positioned block in the first intermediate frame. A search is now conducted within a region 73 defined by a plus or minus 15 pixel displacement in both the X and Y directions. Thus, the search is substantially similar to that described with reference to FIG. 2A. As a result of this search, a block 76 is identified in the reference frame as the block from which pixel values should be obtained in order to reconstitute the block in the first intermediate frame. In addition, a motor vector is indentified which is required to transfer the equivalently positioned block to the position of block 76.

In order to produce a motion vector for the second intermediate frame, a further search is effected within the plus or minus 15 pixel position spacings defined by a region 77 centered on the block 76 position. Again, this results in a further motion vector being calculated which effectively identifies block 78 in the reference frame. Thus, the motion vector for the second intermediate frame would transform block position 72 to block position 78 and the motion vector for the first intermediate frame would transform block position 72 to block position 76.

After calculating the motion vectors for the second intermediate frame, the process is repeated again for region 79 around block 78, again defined by a plus and minus 15 pixel position spacing. As a result of this, a further block position (not shown) within the reference frame is identified and a third motion vector is produced which transform a block in the reference frame to a block within the frame to be transmitted, separated by 3 frame spacings. Thus, a single motion vector is produced by telescoping these, such that a block can be transmitted, along with a motion vector identifying the movement of a block from which difference values have been calculated, within the reference frame separated by 3 frame spacings.

The result of the telescoping procedure is that a single vector is obtained identifying motion of a block in frame 3, which can be used to predict a block in frame 6, without having to do tortuous amounts of computation, as suggested by the illustrated provided by FIG. 6.

A temporal compression circuit for encoding video frames in accordance with the MPEG recommendation, in real-time, is shown in FIG. 8. The circuit shown in FIG. 8 includes an input storage area 81, a reference storage area 82, a motion vector calculation circuit 83, a spatial compressor 84, a spatial compressor 85 and a buffering area 86.

In the example shown, the input storage area includes a first input frame store 87 and a second input frame store 88. The number of frame stores actually included in the input storage area depends upon the grouping of bidirectional frames in the transmitted stream. Thus, in this example, bidirectional frames are grouped in two's, therefore two storage devices 87 and 88 are required. However, in accordance with the recommendation, the number of bidirectional frames included in each bidirectional frame group is variable and it should be understood that when this grouping value increases, a respective increase is required in the number of input frame stores provided in the input storage area.

The reference storage area 82 includes a first reference frame store 89 and a second reference frame store 90. Two frame stores are required in the reference storage area to allow for bidirectional predictive coding. Thus, the provision of frame stores within the reference storage area is not dependent upon the type of the actual MPEG stream employed, in terms of the number of bidirectional frames present in each group.

Reference 91 identifies a list of input frames supplied to the circuit, which is equivalent to the order shown in FIG. 4A. As shown in FIG. 4A, the start of a group is initiated by bidirectional frame B-2, followed by bidirectional frame B-1 and then by the group's intra frame I0. These frames may therefore be referenced as frame numbers 1, 2 and 3 respectively.

When frame B-2 arrives at the circuit, it is not possible to code this frame because coding is effected with reference to the intra frame which, at this stage, has not yet arrived. Thus, a selector 92 writes the input frame data to a first input frame store 87. Similarly, when frame B-1 arrives (frame 2) it is not possible for this frame to be coded therefore selector 92 writes the pixel information to a second input frame store 88.

When the third input frame arrives this will be treated as the I0 frame and, as previously stated, this frame is transmitted without any temporal compression so that frames for a particular group can be regenerated without reference to any other group. Thus, input selector 92 supplies pixel values for the I0 frame directly to an output selector 93 which in turn relays said values to a buffering area 86, via an adder 94 and a spatial compressor 84.

Adder 94 receives prediction values at its second input from the reference storage area 82. The reference storage area 82 includes an input selector 95 and an output selector 96, arranged to write data to the reference frame stores 89 and 90 and to read data from said stores respectively.

When the I0 frame is being supplied to the spatial compressor 84, selector 96 is effectively disabled, such that no additional values are supplied to the adder 94 and no predicted values are subtracted from the values supplied to said adder from the output selector 93.

At the buffering area 86, pixel values generated by the spatial compressor 84 are written to a buffer 97 under the control of a write addressor 98. Thus, as indicated by reference 99, the I0 frame is the first frame written to the buffer 97 under the control of the write addressor 98.

In addition to being supplied to the write addressor 98, the pixel values for the I0 frame generated by the spatial compressor 84 are also supplied to the spatial decompressor 85, effectively performing the reverse function to that of the spatial compressor 84. The output from the spatial compressor is supplied to an adder 100 which receives at its second input the output generated by selector 96. As previously stated, when processing the I0 frame, no output is generated by this selector 96, therefore the output from adder 100, for the I0 frame, is equivalent to the output generated by the spatial compressor 85.

The output from the adder 100 is supplied to the input selector 95 of the reference storage area 82 which in turn writes the pixel values to the first reference frame store 89. The values stored in the input frame stores 87 and 88, along with the values stored in the reference frame stores 89 and 90, are addressable by a motion vector calculation circuit 83. The motion vector calculation circuit 83 is capable of calculating motion vectors from four frames which are temporally displaced from a reference frame by more than one frame spacing, using the technique of telescoping previously described. Thus, using these techniques, the motion vector calculation circuit calculates motion vectors for blocks within the first frame, which is a B-2 frame and for the second frame which is a B-1 frame. Ideally, as shown in FIG. 4B, the B-2 frame should be coded before the B-1 frame. However, it is not possible to calculate backwards motion vectors for the B-2 frame until similar backwards motion vectors have been calculated for the B-1 frame. This is because the motion vectors for the B-2 frame are calculated by a process of telescoping, therefore the vectors generated for the B-1 frame are required as the offset values when calculating motion vectors for the B-2 frame. Thus, the B-1 frame was written to input frame store 88 and, by reading values from this frame store along with values of the I0 frame read from reference frame store 89, the motion vector calculation circuit 83 calculates motion vectors for blocks within frame B-1.

After the motion vectors for frame B-1 have been calculated, it is possible to encode frame B-1. Given that the circuit is required to operate in real time, every saving must be taken to ensure that the data is processed as quickly as possible. Thus, being in a position to code frame B-1 results in the necessary step being taken of actually coding frame B-1. Thus, motion vectors are supplied from the motion vector calculation circuit 83 to output selector 96. In response to these motion vectors, pixel values are read from reference frame store 89, these being pixel values forming part of frame I0, to produce predicted values which are supplied to adder 94. Thus, pixel values for frame B-1 are read from input frame store 88 and supplied, via the output selector 93, to the adder 94. At the adder 94, the predicted values generated by output selector 96 are subtracted from the stored pixel values supplied by output selector 93 and the differences are then supplied to the spatial compressor 84.

The B type frames do not in themselves provide reference frames for any other frames, thus, any output generated by spatial decompressor 85 and supplied to selector 95, does not result in pixel values being supplied to any of the reference frame stores 89 or 90. However, coded pixel values for frame B-1 are supplied to the write addressor 98 which in turn writes these pixel values to the buffer 97.

After frame B-1 has been encoded and the set of related motion vectors has been stored within the motion vector calculating circuit 83, it is possible to encode frame B-2, by firstly calculating motion vectors for this particular frame.

As previously stated, the area of search when calculating motion vectors is reduced by employing the offset determined for frame B-1 by the process of telescoping. Thus, telescoped motion vectors are generated, allowing frame B-2 to be coded with reference to frame I0 which has been stored in the reference frame store 89. This results in pixel values for frame B-2 being read from input frame store 87 by the output selector 93 and being supplied to the spatial compressor 84 via adder 94. At adder 94, the predicted values selected by the output selector 96 are subtracted and the resulting difference values are compressed by compressor 84. Again, it is not necessary to store any of these pixel values as reference values, although said values are supplied to the write addressor 98, which in turn writes them to the buffer 97.

After frames B-2 and B-1 have been coded, it is no longer necessary to retain pixel values for these frames, therefore input stores 87 and 88 may be overwritten. It will also be appreciated that, at this stage, no data has been written to reference store 90.

The next frame to arrive in the input sequence, frame 4, is processed as frame B0. Frame B0 may be bidirectionally encoded, therefore it is not possible to encode this frame until the next B frame has been received. Consequently, frame B0 is written to the first input frame store 87. Input pixel values for frame B0 are also supplied directly to the motion vector calculation circuit 83 which, in real-time, calculates motion vectors with reference to the stored pixel values for the I0 frame. The forward prediction of frame B0 from frame I0 is calculated and stored, for subsequent comparison with the backward prediction from the next P frame.

Similarly the next frame to arrive, frame 5, is also a B type frame, resulting in the pixel values for this frame being written to the second input frame store 88, under the control of the input selector 92, as well as being directed to the output selector 93 for the forward prediction from stored frame I0 as descried with reference to frame B0.

The next frame to arrive, frame 6, is processed as frame P0, a forwardly predicted frame, therefore input selector 92 directs these pixel values directly to the output selector 93. Pixel values for frame P0 are encoded by forwardly predicting values from the stored I0 frame. Input pixel values for the P0 frame are supplied directly to the motion vector calculation circuit 83 which, in real-time, calculates motion vectors with reference to the stored pixel values for the I0 frame, stored in frame store 89, using telescoped motion vectors from frames 4 and 5.

The motion vectors calculated for the P0 frame are supplied to the selector 96, resulting in suitable addressing of reference values from store 89 to provide predicted values for the adder 94.

Pixel values for the P0 frame are supplied, from the output selector 93 to adder 94 and at adder 94 the predicted values are subtracted therefrom to provide an input to the spatial compressor 84. The output from the spatial compressor 84 is supplied to the write addressor 98 which in turn writes coded pixel values to the buffer 97. At the same time, the output coded values from the compressor 84 are supplied to the spatial decompressor 85, to effect the reverse process to that performed by the spatial compressor 84.

As previously stated, the output decompressed pixel values from the spatial decompressor 85 are supplied to the adder 100 which receives, at its second input, the predicted values generated by the selector 96. Thus, pixel values are supplied to selector 95 in a form which should be substantially equivalent to re-constituted pixel values for the P0 frame. These pixel values will themselves provide reference values for B frames therefore said values are written to the second reference frame store 90.

After all of the pixel values for the P0 frame have been considered, it is possible for pixel values for frames B0 and B1, stored in input frame stores 87 and 88 respectively, to be encoded using backward prediction.

In producing motion vectors for the P0 frame, with reference to the I0 frame, the telescoping process will have been implemented by the motion vector calculation circuit 83. Thus, motion vectors have been calculated for frame 4 with reference to frame 3. Similarly, motion vectors have been calculated for frame 5 with reference to frames 3 and 4 and again motion vectors have been calculated for frame 6, the P0 frame, by a process of telescoping, with reference to frame 3, 4 and 5. Thus, motion vectors have already been calculated for the B0 and B1 frames in the forward direction. It is now necessary to calculate motion vectors in the backwards direction, as was done for frames B-2 and B-1.

Again, given that the motion vectors for frame B0 will be calculated by a process of telescoping, it is necessary to calculate the backwards motion vectors for frame B1, i.e. frame 5, first.

In order to effect the calculation of these motion vectors, values are read from the second input frame store 88 and supplied to the motion vector calculation circuit 83. A search is then effected with respect to the reference frame which, on this occasion, will be the P0 frame read from the second reference frame store 90. After the motion vectors have been calculated, they are supplied to selector 96 which, by reading suitable reference values from the second reference frame store 90, allows frame B1 to be encoded. Thus, pixel values for frame B1 are read from frame store 88 and supplied to the adder 94 via selector 93. At the adder 94, the predicted values generated by output selector 96 are subtracted from the actual pixel values supplied by selector 93, resulting in difference values being supplied to the spatial compressor 84. Again, the spatially compressed values generated by the spatial compressor 84 are written to the buffer 97 by means of the write addressor 98.

Once frame B1 has been encoded, it is now possible to encode frame B0. Again, a search is made within regions of the reference frame stored in the second reference frame store 90, which on this iteration will be the P0 frame. Telescoping is effected by using the previously calculated motion vectors, for frame 5, as offsets to the search. The newly calculated motion vectors are supplied to the selector 96, allowing predictive coding to be effected by the adder 94.

Once frames B0 and B1 have been encoded in both the forward and backward direction, the motion vector calculation circuit 83 determines, for the bidirectional frames, whether backward predictive coding, forward predictive coding or interpolative bidirectional coding should be employed. This decision is based upon which coding scheme produces the smallest error. In response to this calculation, selector 96 selects suitable values from either store 89, store 90 or a combination of these two.

As previously stated, the order in which frames are written to the buffer 97, in response to the write addressor 98, is identified by reference 99. This order can be compared with the order required under the MPEG standard, as illustrated in FIG. 4B. In accordance with the standard, the first frame to be transmitted is the I0 frame, followed by the B-2 frame, the B-1 frame and the P0 frame etc. However, given that backwardly predicted motion vectors for the bidirectional frames have been calculated by a process of telescoping, it results that said frames are written to buffer 97 in the wrong order. Thus, as illustrated by list 99, frame B-1 (frame 2) is written to buffer 97 immediately after the I0 frame has been written to said buffer, then followed by the B-2 frame. Thus, the B-1 frame and the B-2 frame have been generated in the wrong order.

This ordering situation is resolved within the buffering area 86 by means of a read addressor 101. Thus, the read addressor 101 is arranged to read compressed panel data in a different order from that in which it was written to the buffer 97. The read addressor 101 is provided with information identifying the location of each compressed frame within the buffer 97. Thus, after information has been written to the buffer 97 in the order shown by list 99, it is read from the buffer 97 in accordance with the recommended ordering, as indicated by list 102. Thus, the first frame to be read from the buffer 97 is the I0 frame which, as previously stated, was the first frame to be written to said buffer. However, thereafter, rather than the B-1 frame being read from the buffer 97, which was the next frame to be written to said buffer, the B-2 frame is read from the buffer which, as shown in list 99, was actually the third frame to be written to said buffer. Thus, the read addressor has effected the re-arrangement of the frame ordering into that required by the recommendation.

As shown by list 102, the next frame to be read is the PO frame, whereafter the B0 frame is read in preference to the B1 frame, which is then read thereafter.

A significant advantage of the system described with reference to FIG. 8 is that, although the buffer 86 provides an important role in enabling the backwards telescopic vector calculation, it does not add significantly to the hardware requirements of the system. Buffer 86 is also necessary because pixel values tend to be written to the buffer at a variable bit rate. The bit rate is dependent greatly upon the inherent redundancy of the image which, obviously, will vary from one video sequence to another. Thus, throughout the video sequence, the actual number of bits produced after compression will vary. However, many video and transmission facilities require a constant bit rate therefore data is read out of buffer 86 at a constant bit rate. Thus, in addition to re-ordering the position of the B frames, the buffer 86 also performs the important function of absorbing fluctuations in the rate at which the data is produced.

A circuit for calculating the motion vectors is shown in FIG. 9. The circuit will be described with reference to a telescoping procedure in which motion vectors are being determined for a frame separated from a reference frame by two frame spacings.

A plurality of processors are provided and when examining an area of pixels for a two frame spacing, five processors are required. Five such processors are shown in FIG. 9, identified as P1 to P5. Each processor determines a motion vector for a particular block of the frame to be coded.

The number of times a reference frame is read is minimised by sequentially reading pixels from a region of a reference frame and supplying the read pixels to all five processors. A region consists of a horizontal band of pixels but, similarly, it could be a vertical band. Pixels from the region are read and the region is moved by one block spacing, whereafter pixels in the newly defined region are read again for the calculation of motion vectors for another group of blocks.

In FIG. 9, motion vectors are being calculated for blocks n−2, n−1, n, n+1 and n+2. If a motion vector were being calculated for block n based on a one frame spacing, it would be necessary to consider all pixels of region 121 of the reference frame. However, given that the blocks being coded are separated by two frame spacings from the reference frame, the range of possible pixel positions is that identified by region 122.

As described with reference to FIG. 7, it is not necessary to consider all of the pixel positions within region 122, because a motion vector has been calculated for the intermediate frame, which is used to apply an offset to the region of pixels being considered. Thus, the area of pixels to be considered is equivalent in size to region 121. However, this area can be positioned anywhere within the space of region 122.

The circuit is arranged to process five motion vectors in parallel. For each of these, the vertical offset of the window of interest (the size of region 121) may be different. Thus, in order to ensure that each processor receives the required pixel values from the reference frame, it is necessary to extend the region read out such that it has a vertical dimension equivalent to the height of region 122.

Region scanning for the region illustrated is initiated at pixel position 123. It extends vertically downwards to the boundary 124 of region 122, a distance of five block spacings. The reading of data is performed in response to addresses generated by an addresser 125, which is programmed to read regions of the required size, dependent upon the number of frame spacings between the frame being coded and the reference frame.

Reading continues by incrementing the horizontal position by one pixel spacing and again reading pixels for the full five block distance. This process is repeated until all pixels in the region have been considered.

As pixels in the block n, along with the blocks above and below block n are being read, processor P1 is supplied with pixel values which may be required to code block n−2. similarly, processor P2 receives pixel values which may be relevent to block n−1, processor P3 receives values which may be required for block n, processor P4 receives values which may be required to code block n+1 and processor P5 receives pixel values which may be required to code block n+2.

As the scanning moves on, within the region, to the next column of blocks, including block n+1, all of the pixels required to calculate a motion vector for block n−2 will have been supplied to processor P1. Thus, processor P1 calculates the motion vector for block n−2 and no further consideration of this block is required. Processor P1 is now free to calculate a motion vector for another block, thus the ordering of the processors, with respect to area positions, effectively circulates and processor P1 continues to receive pixel values from the reference frame but now processes these values with respect to block n+3.

In order to calculate a motion vector, each processor receives five block-columns worth of pixel data. Each processor therefore receives pixel data for an area of pixels five blocks by five blocks square, however, due to the offset defined by the previous motion vector and as a result of telescoping, the processor only needs to process an area of pixels three blocks by three blocks square. Furthermore, within the time available, it would not be possible to process a five block by five block area.

In order to take advantage of the telescoping procedure, while allowing pixel data from the reference frame to be supplied to a plurality of processors, motion vectors for the previous frame (or frames) are supplied to an enabling circuit 126. The enabling circuit is arranged to calculate, for each processor, when it is receiving data from the reference frame which is actually required, in order to calculate the telescoped motion vector. When such data is being read from the reference frame, an enabling signal is generated and supplied to the respective processor.

As pixel values are been read from the reference frame, some of these values will be required by processor P1. When pixel values are been read which are required by P1, an enabling signal is generated by the enabling circuit 126 and supplied to P1 over a processor enable line 127. Similarly, if the pixel values being read are required by P2, an enabling signal is supplied to P2 over line 128. Furthermore, similar enabling lines 129, 130 and 131 are provided from the enabling circuit 126 to respective processors P3, P4 and P5.

Thus for a processing circuit (P1 etc) to calculate a motion vector for a particular block, it receives pixel values from an area equivalent in size to a five block by five block area. However, the processor only processes data from an area equal to three blocks by three blocks, although this area could be positioned anywhere within the larger five block by five block area. The smaller three by three block area is defined by the enabling circuit 126, such that the processors only latch data, in response to the enabling signal, when pixels are being read which are present within the area of interest.

Once a full horizontal region has been read, having a height of five block spacings, a new region is selected by moving the region vertically by one block spacing. Thus, each row of blocks falls within five overlapping regions (except at the edges of the frame) and each pixel value is read five times.

When telescoping over larger distances, more processors are required, given that the area within this the pixels of interest are present may be larger. Thus, when separated by three frame spacings, seven processors are required. The enabling signal will again identify an area three blocks by three blocks square, in response to telescoped motion vectors. Thus, as the distance between frames increases, the amount of data read out increases but the amount actually processed by the processors, while the enabling signal is active, remains the same proportionally more of the data being ignored due to the enabling signals being in-active.

I claim:

1. A method of backward predictive coding frames of a video signal, said method comprising:

generating motion vectors for a frame n−1 with reference to a frame n, n and n−1 being integers identifying the relative position of respective frames within a sequence of frames;

generating motion vectors for a frame n−2 with reference to a frame n using said motion vectors for frame n−1, n−2 also being an integer identifying the relative position of a frame within said sequence of frames;

coding frame n−1 by predictive coding using said motion vectors for frame n−1; writing coded frame n−1 to a buffer before coding frame n−2 by predictive coding using said motion vectors for frame n−2 and writing coded frame n−2 said buffer; and reading coded frame n−2 from said buffer prior to reading coded frame n−1 from said buffer.

2. A method as in claim 1, wherein a frame n is predicted from an earlier frame n−m by forward predictive coding, m also being an integer and the integer n−m identifying the relative position of a frame within said sequence of frames.

3. A method as in claim 2, wherein frame n−m is transmitted without reference to any preceding or subsequent frames.

4. A method as in claim 2, wherein frame n–m is coded by forward predictive coding from another frame.

5. A method as in claim 1 wherein data is written to the buffer at a variable bit rate and read from said buffer at a substantially constant bit rate.

6. Apparatus for predictively coding frames of a video signal, said apparatus comprising:
   means for generating motion vectors, said means serving to generate motion vectors for a frame n–1 with reference to a frame n and then to generate motion vectors for a frame n–2 with reference to a frame n making use of said vectors for frame n–1, n, n–1 and n–2 being integers identifying the relative position of respective frames within a sequence of frames;
   means for coding the video frames by predictive coding using said motion vectors for the frame n–1 and the frame n–2.

7. Apparatus as in claim 6, including:
   means for coding frame n by forward predictive coding from a frame n–m, m also being an integer and the integer n–m identifying the relative position of a frame within said sequence of frames.

8. Apparatus as in claim 7, including:
   means for coding frame n–m without reference to any other frame.

9. Apparatus as in claim 7, including:
   means for forwardly predictively coding frame n–m from a previous frame.

10. Apparatus as in claim 6, wherein said buffering means is arranged to receive coded data at a variable bit-rate.

11. Video conferencing apparatus or video telephony apparatus including apparatus for predictively coding as in claim 6.

12. A method of predictively coding frames of a video signal, the method comprising:
   firstly generating motion vectors for a frame n–1 with respect to a frame n, coding frame n–1 by predictive coding using said motion vectors and writing it to a buffer, n and n–1 being integers identifying the relative position of respective frames within a sequence of frames,
   secondly generating motion vectors for a frame n–2 by searching an area offset by the motion vectors for frame n–1, coding frame n–2 by predictive coding using said motion vectors for the frame n–2 and writing it to the buffer, n–2 also being an integer identifying the relative position of a frame within said sequence of frames, and
   reading coded frame n–2 from the buffer prior to reading coded frame n–1 from the buffer.

13. A method of predictively coding frames of a video signal according to claim 12 wherein, prior to generating the motion vectors with respect to frame n, motion vectors for frames n–2, n–1 and n are generated with respect to an earlier frame n–m, where m is an integer greater than 2.

14. A method as in claim 13 wherein the frame n–m is coded without reference to any preceding or subsequent frame.

15. Apparatus for predictively coding frames of a video signal, said apparatus comprising:
   means for firstly generating motion vectors for a frame n–2 by searching an area offset by the motion vectors for frame n–1, coding frame n–2 by predictive coding using said motion vectors for the frame n–2 and writing it to the buffer, n–2 also being an integer identifying the relative position of a frame within said sequence of frames, and
   means for reading coded frame n–2 from the buffer prior to reading coded frame n–1 from the buffer.

16. A method of coding a video signal in which at least some frames are coded by motion-compensated inter frame predictive coding, said method comprising:
   generating motion vectors for a first frame with reference to a reference frame, said first frame preceding said reference frame;
   generating motion vectors for a second frame with reference to said reference frame, said second frame preceding said reference frame, each such motion vector being generated by comparing a portion of the second frame with portion of the reference frame lying within a search area chosen in dependence on a motion vector generated for the corresponding portion of the first frame;
   coding said first frame by predictive coding using said motion vectors for said first frame and writing this first coded frame to a buffer before coding said second frame by predictive coding using said motion vectors for said second frame and writing this coded second frame to said buffer; and
   reading said coded second frame from the buffer prior to reading said first coded frame from said buffer.

17. Apparatus for coding a video signal in which at least some frames re coded by motion-compensated inter frame predictive coding, said apparatus comprising:
   means for generating motion vectors for a first frame with reference to a reference frame, said first frame preceding said reference frame;
   means for generating motion vectors for a second frame with reference to said reference frame, said second frame preceding said reference frame, each such motion vector being generated by comparing a portion of the second frame with portions of the reference frame lying within a search area chosen in dependence on a motion vector generated for the corresponding portion of the first frame;
   means for coding said first frame by predictive coding using said motion vectors for said first frame and writing the first coded frame to a buffer before coding said second frame by predictive coding using said motion vectors for said second frame and writing this coded second frame to said buffer; and
   means for reading said coded second frame from the buffer prior to reading said first coded frame from said buffer.

* * * * *